US012393352B2

(12) United States Patent
Dover et al.

(10) Patent No.: US 12,393,352 B2
(45) Date of Patent: Aug. 19, 2025

(54) AUTHENTICATED MODIFICATION OF MEMORY SYSTEM DATA

(71) Applicant: Micron Technology, Inc., Boise, ID (US)

(72) Inventors: Lance W. Dover, Fair Oaks, CA (US); Giuseppe Vito Portacci, Vimercate (IT); Giuseppe Ferrari, Naples (IT)

(73) Assignee: Micron Technology, Inc., Boise, ID (US)

( * ) Notice: Subject to any disclaimer, the term of this patent is extended or adjusted under 35 U.S.C. 154(b) by 263 days.

(21) Appl. No.: 17/664,320

(22) Filed: May 20, 2022

(65) Prior Publication Data

US 2023/0129539 A1 Apr. 27, 2023

Related U.S. Application Data

(60) Provisional application No. 63/270,930, filed on Oct. 22, 2021.

(51) Int. Cl.
G06F 21/00 (2013.01)
G06F 3/06 (2006.01)
G06F 21/62 (2013.01)
G06F 21/78 (2013.01)
H04L 9/40 (2022.01)

(52) U.S. Cl.
CPC .......... *G06F 3/0622* (2013.01); *G06F 3/0659* (2013.01); *G06F 3/0679* (2013.01); *G06F 21/6218* (2013.01); *G06F 21/78* (2013.01); *H04L 63/0428* (2013.01)

(58) Field of Classification Search
CPC .... G06F 3/0622; G06F 3/0659; G06F 3/0679; G06F 21/6218; G06F 21/78; H04L 63/0428
See application file for complete search history.

(56) References Cited

U.S. PATENT DOCUMENTS

| 2007/0136407 | A1* | 6/2007 | Rudelic ................... G06F 21/78 708/250 |
| 2009/0307497 | A1* | 12/2009 | Appenzeller ......... H04L 9/0861 713/171 |
| 2017/0371809 | A1* | 12/2017 | Benedict ............. G06F 12/1408 |
| 2018/0196661 | A1* | 7/2018 | Fukuda ..................... G06F 8/66 |

* cited by examiner

*Primary Examiner* — Jeffrey C Pwu
*Assistant Examiner* — Thong P Truong
(74) *Attorney, Agent, or Firm* — Holland & Hart LLP

(57) ABSTRACT

Methods, systems, and devices for authenticated modification of memory system data are described. A host system may transmit a command to program data to a protection region of a memory system, and the host system may sign the command using a key associated with the protection region. In some examples, the host system may transmit the data associated with the command, or the command may include instructions to move the data from another region of the memory system. Upon receiving the command, the memory system may verify the signature to determine whether the host is authorized to modify the protection region, and may program the data as requested by the host system. In some cases, the protection regions of the memory system may be updated, for example by adjusting the size or address range of the protection regions, in response to a command from the host system.

20 Claims, 8 Drawing Sheets

AUTHENTICATED MODIFICATION OF MEMORY SYSTEM DATA

CROSS REFERENCE

The present application for patent claims the benefit of U.S. Provisional Patent Application No. 63/270,930 by DOVER et al., entitled "AUTHENTICATED MODIFICATION OF MEMORY SYSTEM DATA," filed Oct. 22, 2021, assigned to the assignee hereof, and expressly incorporated by reference in its entirety herein.

FIELD OF TECHNOLOGY

The following relates generally to one or more systems for memory and more specifically to authenticated modification of memory system data.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
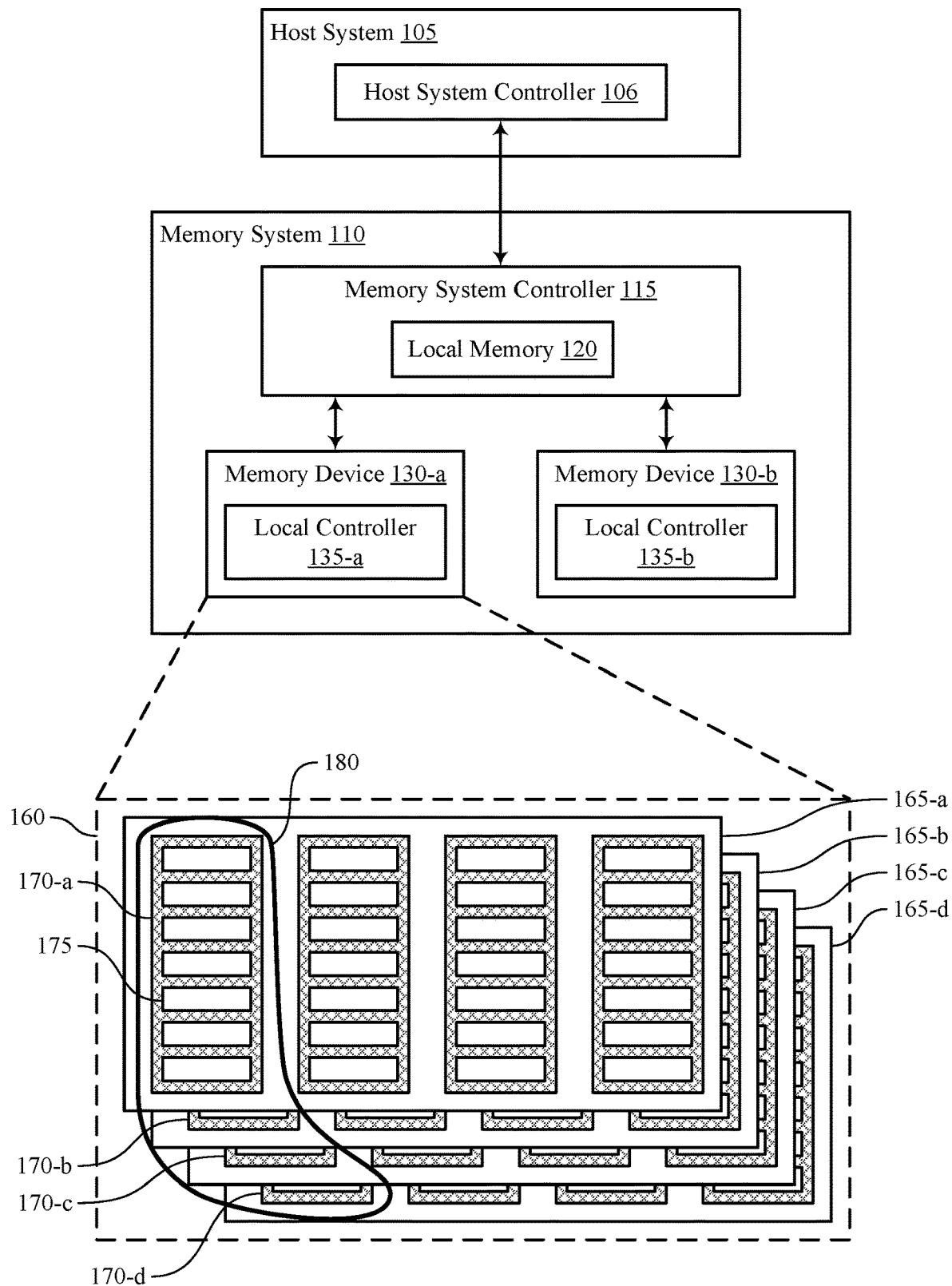
FIG. 1 illustrates an example of a system that supports authenticated modification of memory system data in accordance with examples as disclosed herein.

Some computing platforms may involve one or more host systems that are operable to communicate with (e.g., directly or indirectly) one or more memory systems. For example, a host system may transmit commands to a memory system to program data stored in a secure location, such as a replay protected memory block (RPMB) using pairs of symmetric keys stored at the host system and the memory system. However, some approaches to programming data in protection regions of the memory device may include removing the protected status of the region while programming the data, which may leave the memory system vulnerable to malicious parties, which may attempt to access the data while the region is unprotected. Further, some approaches to protecting regions of the memory device, such as by using an RPMB, may not allow for more secure data protection schemes, such as using asymmetric keys to sign and verify data or updating host system or memory system keys over time. Additionally, some approaches may not allow custom configuration or dynamic adjustment of protection region attributes, such as size of the protection region or a range of addresses associated with the protection region. Efficient techniques to program data in protection regions of a memory device are desired.

As described in the present disclosure, a host system and a memory system may exchange keys used to grant the host system access to one or more protection regions of the memory system. In some examples, a protection region may include a write-protect group of the memory system, which may include an aligned area of memory with a particular size (e.g., 8 megabytes (MB)). The keys may symmetric (e.g., the host system and the memory system may share a same key) or asymmetric (e.g., both the host system and the memory system may have a unique private key, and may each share a corresponding public key with the other), and may be updated periodically (e.g., according to a cryptoperiod determined by the host system or the memory system). Additionally, the host system and the memory system may exchange separate keys for different protection regions of the memory system.

The host system may transmit a command to program data to a protection region of the memory system, and the host system may sign the command using the key associated with the protection region. In some examples, the host system may transmit the data associated with the command, or the command may include instructions to move the data from another region (e.g., an unprotection region) of the memory system. Upon receiving the command, the memory system may verify the signature to determine whether the host is authorized to modify the protection region, and may program the data as requested by the host system. In some cases, the protection regions of the memory system may be updated, for example by adjusting the size or address range of the protection regions, in response to a command from the host system. Techniques described herein may increase the security of the computing platform, for example by more thoroughly protecting data from malicious parties.

Features of the disclosure are initially described in the context of systems, devices, and circuits with reference to FIG. 1. Features of the disclosure are described in the context of systems and a process flow with reference to FIGS. 2-4. These and other features of the disclosure are further illustrated by and described in the context of an apparatus diagram and flowchart that relate to that relate to authenticated modification of memory system data with reference to FIGS. 5-8.

FIG. 1 illustrates an example of a system 100 that supports authenticated modification of memory system data in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support authenticated reading of memory system data. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, a host system 105 and a memory system 110 may exchange keys used to grant the host system 105 access to one or more protection regions of the memory system 110 (e.g., one or more protection regions of a memory device 130). The keys may symmetric (e.g., the host system 105 and the memory system 110 may share a same key) or asymmetric (e.g., both the host system 105 and the memory system 110 may have a unique private key, and may each share a corresponding public key with the other), and may be updated periodically (e.g., according to a cryptoperiod determined by the host system 105 or the memory system 110). In some examples, the host system 105 and the memory system 110 may exchange separate keys for different protection regions of the memory system 110.

The host system 105 may transmit a command to program data to a protection region of the memory system 110, and the host system 105 may sign the command using the key associated with the protection region. In some examples, the host system 105 may transmit the data associated with the command, or the command may include instructions to move the data from another region (e.g., an unprotection region) of the memory system 110. Upon receiving the command, the memory system 110 may verify the signature to determine whether the host system 105 is authorized to modify the protection region, and may program the data as requested by the host system 105. In some cases, the protection regions of the memory system 110 may be updated, for example by adjusting the size or address range of the protection regions, in response to a command from the host system 105. Techniques described herein may increase the security of the computing platform, for example by more thoroughly protecting data from malicious parties.

Figure 2:
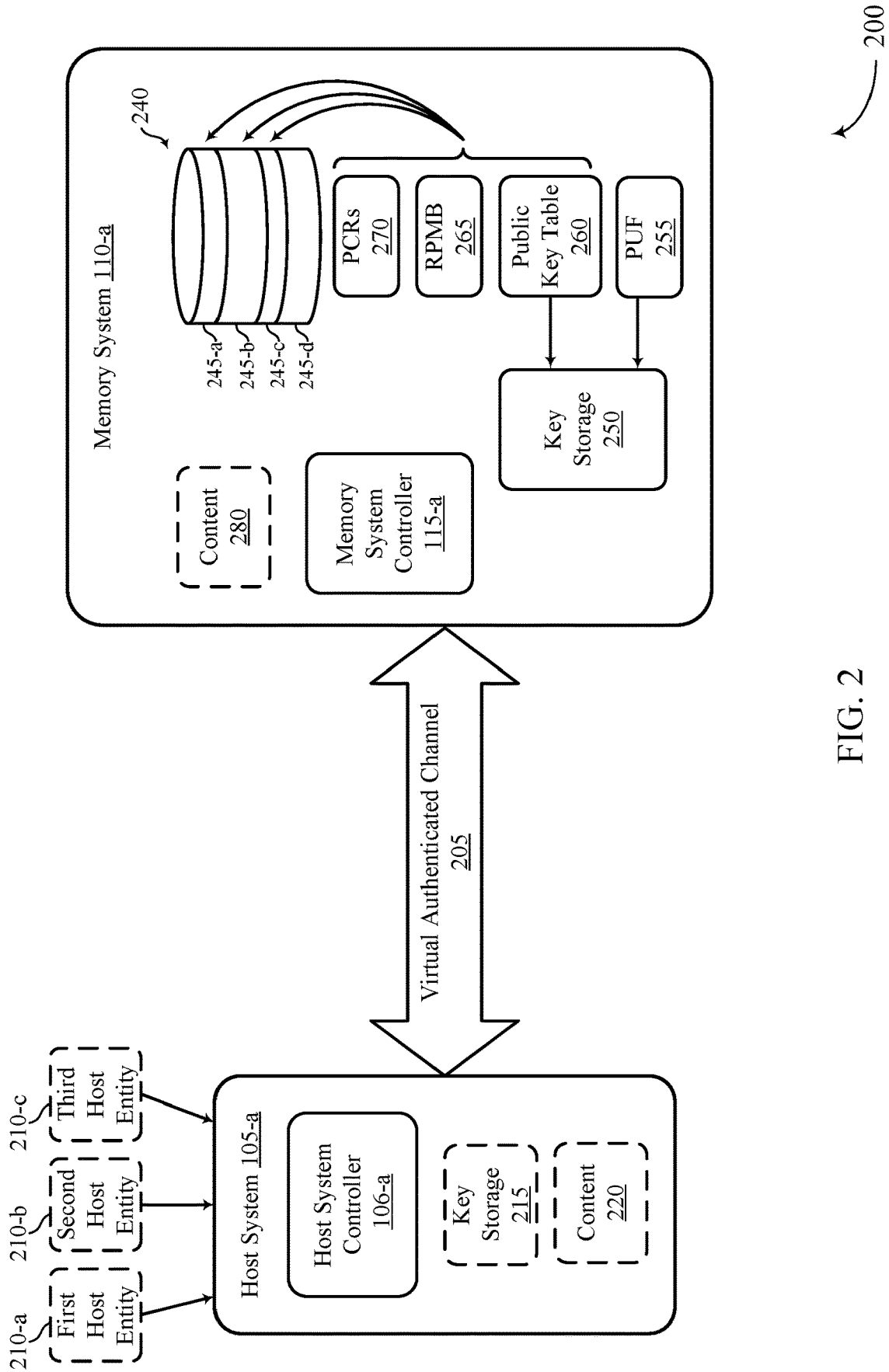
FIG. 2 illustrates an example of a system that supports authenticated modification of memory system data in accordance with examples as disclosed herein.

FIG. 2 illustrates an example of a system 200 that supports authenticated modification of memory system data in accordance with examples as disclosed herein. The system 200 may include a host system 105-*a* and a memory system 110-*a*, which may be examples of the respective systems described with reference to FIG. 1. The host system 105-*a* and the memory system 110-*a* may implement various techniques for exchanging public keys to support the communication of signaling between the respective systems with identity authenticity (e.g., signatures) and integrity (e.g., encryption), among other characteristics, which may be based on unique and private cryptographic identities of the host system 105-*a* and the memory system 110-*a*. The host system 105-*a* may include a host system controller 106-*a* and the memory system 110-*a* may include a memory system controller 115-*a*, and, in some examples, the host system controller 106-*a* and the memory system controller 115-*a* may be configured to perform one or more of the described operations at the host system 105-*a* and the memory system 110-*a*, respectively. Although techniques are described with reference a single host system 105-*a* and a single memory system 110-*a* of the system 200, the described techniques may be extended to support implementations of a host system 105 that is coupled with any quantity of memory systems 110, or implementations of a memory system 110 that is coupled with any quantity of host systems 105, or implementations of a network of multiple host systems 105 coupled with multiple memory systems 110.

The host system 105-*a* may be an example of a system that uses at least a portion of the memory system 110-*a* (e.g., storage 240) for information storage, which may include various operations that support the host system 105-*a* writing information to the memory system 110-*a*, or the host system 105-*a* reading information from the memory system 110-*a*, or both. In some examples, the host system 105-*a* may be characterized as being "local," which may refer to a relatively direct or proximal physical, electrical, or otherwise communicative coupling. In some other examples, the host system 105-*a* may be characterized as being "remote," which may refer to a relatively distant (e.g., non-co-located) communicative coupling that may involve one or more wired, wireless, optical, or otherwise relatively distant communicative couplings, such as a cloud application or otherwise distributed compute system.

In some examples, the host system 105-*a* may include, may be coupled with, or may be otherwise associated with one or more host entities 210. Host entities 210 may be implemented as hardware entities, firmware entities, or software entities, and may include various serial, parallel, or hierarchical coupling or logical organization with or via the host system 105-*a*. In some examples, the host entities 210 may request or otherwise perform signaling with the memory system 110-*a* via a common controller or interface (e.g., via host system controller 106-*a*). In various examples, host entities 210 may be associated with different functions, different feature sets, different permissions, different storage attributes (e.g., data protection attributes), among other different characteristics.

In some examples, each of the host entities 210 may be associated with a unique identifier (e.g., a secret identifier, a unique device secret, a unique entity secret), which may include or may support the generation of a respective private key for the host entity 210. In some examples, an identifier of a host entity 210 may not, itself, be private, but a private key may be generated (e.g., by the host system 105-*a*) for a host entity 210 based on an identifier (e.g., public or private) of the host entity 210 and a private identifier of the host system 105-*a* (e.g., a private master identifier). Such techniques may support each of the host entities 210 being uniquely identified and authenticated (e.g., separately from other host entities 210) in accordance with examples as disclosed herein.

The example of host system 105-*a* may be associated with an original equipment manufacturer (OEM) host entity 210-*a* (e.g., a first host entity), an operating system (OS) vendor host entity 210-*b* (e.g., a second host entity), and an independent software vendor (ISV) host entity 210-*c* (e.g., a third host entity). In some other examples, a host system 105 may include or be otherwise associated with any quantity of one or more host entities 210 including but not limited to one or more OEM host entities 210, OS vendor host entities 210, ISV host entities 210, or other types of host entities. In some examples, host entities 210 may be omitted or otherwise not separately considered, in which case a master private key may be implemented by the host system 105-*a* (and any host entities 210, where applicable), which may be based on a single or shared unique identifier of the host system 105-*a* (e.g., a secret identifier, a unique device secret, or a unique host secret associated with the host system 105-*a*).

In some examples, the host system 105-*a* may be associated with a location for storing authentication or encryption information (e.g., generated or received keys, certificates), such as a key storage 215. For example, the host system 105-*a* may use the key storage 215 to store one or more private keys or certificates associated with the host system 105-*a*. In some examples, a key storage 215 may be a portion of the host system 105-*a*, such as an implementation of a dedicated storage component of the host system 105-*a*. Additionally or alternatively, one or more components of the key storage 215 may be located outside the host system 105-*a*, but may be otherwise accessible by the host system 105-*a* (e.g., in a secure manner). In various examples, the key storage 215 may include a non-volatile storage location (e.g., for static keys or keys maintained for a relatively long time), or a volatile storage location (e.g., for ephemeral keys or keys that are otherwise generated relatively frequently), or both. Although the key storage 215 is illustrated separately from the host system controller 106-*a*, in some examples, the key storage 215 may be part of or otherwise associated with the host system controller 106-*a*, such as a storage location that also includes firmware for the host system 105-*a* or the host system controller 106-*a*.

In some examples, the host system 105-*a* may include content 220, which may refer to various types of information stored at the host system 105-*a*. In some examples, content 220 may be accessed or otherwise used to support various key generation (e.g., content-based key generation) or other cryptographic techniques in accordance with examples as disclosed herein. For example, the content 220 may include firmware of the host system 105-*a*, such as boot code (e.g., second-stage boot code, "L1" boot code), or a firmware security descriptor (FSD), which may be used to establish an operating or cryptographic state (e.g., a firmware state) of the host system 105-*a*. In some examples, information associated with the content 220 may be transmitted to the memory system 110-*a* to support various authentication or encryption techniques (e.g., for the memory system 110-*a* to generate keys or certificates for operation with the memory system 110-*a*). Although the content 220 is illustrated separately from the host system controller 106-*a*, in some examples, the content 220 may be part of or otherwise associated with the host system controller 106-*a*, such as a storage location that includes firmware for the host system 105-*a* or the host system controller 106-*a*.

The memory system 110-*a* may include storage 240, which may refer to a collective storage capacity of one or more instances of local memory 120, or of one or more memory devices 130, or various combinations thereof that are included in or are otherwise associated with the memory system 110-*a*. In some examples, the storage 240 may be divided or otherwise organized in partitions 245 (e.g., memory ranges, address ranges), which may refer to various subsets or ranges of logical addresses or physical addresses of the associated local memory 120 or memory devices 130. In some examples, the partitions 245 may be assigned with an initial range of addresses, and may be updated with an assignment to a different range of addresses, including an appending of additional new addresses, an assignment to a subset of the initial range of addresses (e.g., a trimming of ranges), or an assignment to an entirely new range of addresses.

In some examples, partitions 245, or portions thereof, may be assigned to or allocated to different functions or attributes, such as examples where one or more partitions 245 are associated with a respective one or more host entities 210, or their respective public or private keys. In an example implementation, a partition 245-*a* may be associated with the OEM host entity 210-*c*, a partition 245-*b* may be associated with the OS vendor host entity 210-*b*, and a partition 245-*c* may be associated with the ISV host entity 210-*c*. In some examples, a partition 245-*d* may be unallocated (e.g., not dedicated to a certain purpose or entity, free space), or may be shared among multiple host entities 210, among other examples for allocating partitions 245. In some examples, partitions 245 may be used to implement various hierarchical keying or authentication techniques. For example, each partition 245, or some portion of a partition 245, may be assigned with or updated with a protection attribute (e.g., enabling or disabling a write-protection attribute, enabling or disabling a read protection attribute), which may be associated with various keys, authentications, or encryptions that are specific to a given host entity 210, or that are common to the host system 105-*a* in general, among other examples.

In some examples, the memory system 110-*a* may be associated with a location for storing authentication or encryption information (e.g., generated or received keys, certificates), such as a key storage 250. For example, the memory system 110-*a* may use the key storage 250 to store one or more private keys associated with the memory system 110-*a*, or one or more public keys or certificates generated by the memory system 110-*a*, or one or more public keys or certificates received from the host system 105-*a* (or other host systems 105, not shown). In some examples, the key storage 250 may be a portion of the memory system 110-*a*, such as an implementation of a dedicated storage component of the memory system 110-*a*. Additionally or alternatively, the key storage 250 may be located outside the memory system 110-*a*, but may be otherwise accessible by the memory system 110-*a* (e.g., in a secure manner). In various examples, the key storage 250 may include a non-volatile storage location (e.g., for static keys or keys maintained for a relatively long time), or a volatile storage location (e.g., for ephemeral keys or keys that are otherwise generated relatively frequently), or both. Although the key storage 250 is illustrated separately from the storage 240, the key storage 250 may, in some examples, be included in a portion of the storage 240 (e.g., in a separate or dedicated partition 245). Further, although the key storage 250 is illustrated separately from the memory system controller 115-a, in some examples, the key storage 250 may be part of or otherwise associated with the memory system controller 115-a, such as a storage location that also includes firmware for the memory system 110-a or the memory system controller 115-a (e.g., a local memory 120).

In some examples, the memory system 110-a may include a physical unclonable function (PUF) 255, which may support the assignment of or generation of an identifier that is unique to the memory system 110-a (e.g., for generating a secret identifier or a unique device secret of the memory system 110-a). The PUF 255 may include various components or circuit elements that have an intrinsic physical characteristic that is unique to the PUF 255, which may be leveraged to establish an intrinsic uniqueness of the memory system 110-a. For example, the PUF may include a set of one or more transistors, resistors, capacitors, memory cells (e.g., SRAM cells, which may, in some cases, be included in local memory 120 described with reference to FIG. 1), or other circuit elements or combination thereof which, when accessed, support the generation of a digital signature that is unique to the memory system 110-a. In some examples, a controller of the memory system 110-a (e.g., the memory system controller 115-a) may access or otherwise interact with the PUF 255 to generate one or more private keys for the memory system 110-a, which may subsequently be used to generate public keys for establishing authenticity or encryption between the memory system 110-a and the host system 105-a (e.g., or the host entities 210, where applicable). Although the PUF 255 is illustrated as being separate from the key storage 250, in some examples, the PUF 255 may be included in or be otherwise interpreted as being part of the key storage 250 (e.g., part of the memory system controller 115-a, part of a local memory 120 of the memory system 110-a).

In various implementations, the PUF 255 itself, or signaling generated by the PUF 255, or both may be inaccessible from outside the memory system 110-a. Such inaccessibility may be supported by various implementations of including the PUF 255, and other components involved in the described cryptographic techniques, in a portion of the memory system 110-a where attempts to access such components would be destructive to the components, or where such components or associated signaling are otherwise shielded from destructive or non-destructive probing or snooping techniques. For example, at least the PUF 255 and the other components involved in the described cryptographic techniques (e.g., components involved in handling private keys or unique device secrets, which may include at least a portion of the memory system controller 115-a or at least some portion thereof), if not all the components of the memory system 110-a, may be implemented in a contiguous semiconductor chip such as an SoC implementation.

In some examples, the memory system 110-a may include a public key table 260 (e.g., an elliptical curve cryptography public key table), which may be configured to store, organize, or allocate public keys such as those received from the host system 105-a, or those generated at the memory system 110-a, or both. In some examples (e.g., in implementations where host entities 210 are associated with respective public keys that are transmitted by the host system 105-a), the public key table 260 may hold a respective public key, or mapping thereof, for each of the OEM host entity 210-a, the OS vendor host entity 210-b, and the ISV host entity 210-c (e.g., associated with the partitions 245-a, 245-b, and 245-c, respectively). Although the public key table 260 is illustrated as being separate from the key storage 250, in some examples, the public key table 260 may be included in or be otherwise interpreted as being part of the key storage 250 (e.g., part of the memory system controller 115-a, part of a local memory 120 of the memory system 110-a).

In some implementations, the public key table 260 may be associated with a mapping between public keys and device identifiers, or partitions 245, or protection attributes (e.g., write-protection configurations, read protection configurations), or various combinations thereof, among other mapping between keys and associated configurations. For example, the public key table 260 may provide a mapping for one or more host systems 105 (e.g., the host system 105-a), or a host entity 210 thereof, with a particular public key or symmetric key. Such a mapping may also include a mapping between such keys and one or more partitions 245, or a mapping between such keys or partitions 245 with one or more protection attributes, such as whether a partition 245 is configured with read protection, write-protection, or both. In some examples, a mapping of the public key table 260 may include a mapping of a key, a host system 105, or a host entity 210 with multiple partitions 245, which may support each partition 245 using a common key but having a unique protection attribute. In some examples, the public key table may support a key hierarchy that allows a master host system 105, or associated key, to assign partitions 245 to another host system 105 or to a host entity 210, or their respective keys.

In some examples, the memory system 110-a may include a platform configuration register (PCR) 270, which may store or measure a software state (e.g., version, update status), such as a state of software running on the memory system 110-a, and configuration data used by such software (e.g., to represent the platform software state of the memory system 110-a). In some examples, the PCR 270 may include information that can be evaluated to determine whether the memory system 110-a has been compromised or may be otherwise untrustworthy. Although the PCR 270 is illustrated separately from the memory system controller 115-a, in some examples, the PCR 270 may be part of or otherwise associated with the memory system controller 115-a, such as a location associated with firmware for the memory system 110-a or the memory system controller 115-a (e.g., a local memory 120). Such techniques may support the PCR 270 storing or measuring a state of such firmware, which may be used to evaluate whether such firmware has been adversely updated (e.g., to evaluate whether the memory system 110-a can be authenticated).

In some examples, the memory system 110-a may include an RPMB 265, which may be provided as a means to store data in an authenticated and replay protected manner, which may only be read and written via successfully authenticated read and write accesses. In some examples, the RPMB 265 may include information that can be evaluated to determine whether signaling exchanged with the memory system 110-a has been intercepted and replayed, which may indicate whether one or more devices or connections of the system 200 are untrustworthy. Although the RPMB 265 is illustrated separately from the memory system controller 115-a, in some examples, the RPMB 265 may be part of or otherwise associated with the memory system controller 115-a, such as a storage location that includes firmware for the memory system 110-*a* or the memory system controller 115-*a* (e.g., a local memory 120). In some examples, the RPMB 265 may be associated with a fixed size, a fixed set of addresses, or both.

In some examples, the memory system 110-*a* may include content 280, which may refer to various types of information stored at the memory system 110-*a*. In some examples, content 280 may be accessed or otherwise used to support various key generation (e.g., content-based key generation) or other cryptographic techniques in accordance with examples as disclosed herein. For example, the content 280 may include firmware of the memory system 110-*a*, such as boot code (e.g., first-stage boot code, "L0" boot code, second-stage boot code, "L1" boot code), or an FSD, which may establish an operating or cryptographic state of the memory system 110-*a*. In some examples, information associated with the content 280 may be used by the memory system 110-*a* to support various authentication or encryption techniques (e.g., to generate a certificate for operation with the host system 105-*a*). Although the content 280 is illustrated separately from the memory system controller 115-*a*, in some examples, the content 280 may be part of or otherwise associated with the memory system controller 115-*a*, such as a storage location that includes firmware for the memory system 110-*a* or the memory system controller 115-*a*. Further, although the content 280 is illustrated separately from the storage 240, the content 280 may, in some examples, refer to information that is included in a portion of the storage 240 (e.g., in a separate or dedicated partition 245). In some implementations, the content 280 may receive information from or may refer to one or more aspects of the PCR 270.

One or more components of the system 200 may be configured to implement asymmetric key distribution to establish authenticated signaling, encrypted signaling, or both between the host system 105-*a* and the memory system 110-*a* (e.g., in accordance with authenticated system identity), which may include an implementation of cryptographic security functionality directly in the memory system 110-*a* (e.g., leveraging capabilities of the memory system controller 115-*a* to support various techniques for asymmetric cryptography). In some examples, such techniques may involve passing fundamentally public device identification information between the host system 105-*a* and the memory system 110-*a* that supports private authentication of the respective system (e.g., device-specific or hardware-specific authentication without trying to maintain secrecy or avoid exposure of exchanged private or secret keying material corresponding to respective devices). In some examples, such asymmetric cryptography may be utilized to derive equivalent or otherwise symmetric keys on each side of signaling exchange (e.g., at each of the host system 105-*a* and the memory system 110-*a*) using a common secret that is not itself communicated between the host system 105-*a* and the memory system 110-*a*, which may leverage efficiencies of symmetric key techniques for authenticated or encrypted signaling relative to asymmetric key techniques. In some examples, such techniques may be implemented to establish a virtual authenticated channel 205 between the host system 105-*a* and the memory system 110-*a*, which may be used to transmit signaling (e.g., encrypted signaling, unencrypted signaling) and associated signatures (e.g., asymmetric signatures such as elliptic curve digital signature algorithm (ECDSA) signatures, symmetric signatures such as hashed message authentication code (HMAC) signatures) between the host system 105-*a* and the memory system 110-*a*.

In some examples, the system 200 may be configured to support a signing and verifying (e.g., authentication) of signaling between the host system 105-*a* and the memory system 110-*a* (e.g., in accordance with signed command signaling, signed request signaling, signed data signaling, or signed response signaling), which may be implemented to authenticate the transmitting system of such signaling, or to ensure that the signaling has not been altered before being received by a receiving system, or both. In accordance with such techniques, a receiving system may be able to evaluate received signaling to determine whether transmitted signaling was transmitted by an unverified or unauthorized transmitting system, or whether the transmitted signaling was altered or otherwise compromised. In some examples, such techniques may support a one-to-many security arrangement, since multiple receiving systems may be able to implement a same public key (e.g., of an asymmetric key pair) of the transmitting system that is associated with a single private key (e.g., of the asymmetric key pair) of the transmitting system. A key that is included in a same key pair as another key may be referred to as a counterpart key for the other key (e.g., a private key and a public key within an asymmetric key pair may be counterparts for each other, and two symmetric keys within a symmetric key pair may be counterparts for each other).

In some examples for signing and verifying signaling between the host system 105-*a* and the memory system 110-*a*, a signature for a given instance of signaling (e.g., a message, a command, a request, a data packet, a response) may be derived by hashing or otherwise processing the instance of signaling with a function (e.g., a hash function, a cryptographic hash algorithm) that receives, as an input, the instance of signaling and a private key associated with the transmitting system. The output of such a function (e.g., a signature, a hash digest) may be recreated using the same function with the same instance of signaling and either the same private key associated with the transmitting system or an associated public key (e.g., of an asymmetric key pair) associated with the transmitting system. In an example, for an instance of signaling associated with a 1-megabyte program operation, a hashing function based on the 1-megabytes of data and a private key may be a 256-bit signature or hash digest.

To support verifying the authenticity of the transmitting system, the transmitting system may transmit the instance of signaling along with the corresponding signature, which may be received by a receiving system. The receiving system may have received or otherwise generated the associated public key of the transmitting system and, accordingly, may generate a trial signature based on the received instance of signaling and the associated public key of the transmitting system. If the trial signature matches the received signature, the receiving system may determine that the transmitting system was authentic (e.g., that the instance of signaling is a transmission from a trusted system) and may continue with processing or otherwise performing a responsive action to the received instance of signaling. In some implementations, signature generation may be configured such that, even when an instance of signaling is the same, a generated signature will be different. In such implementations, signature generation and verification operations may be further based on a random number, a nonce, or a monotonic counter that is understood to both the transmitting system and the receiving system.

In some examples, the system 200 may be configured to support an encryption and decryption of signaling between the host system 105-a and the memory system 110-a (e.g., in accordance with encrypted signatures, encrypted command signaling, encrypted request signaling, encrypted data signaling, or encrypted response), which may be implemented to secure the contents of such signaling from being intercepted and interpreted or otherwise processed (e.g., to maintain integrity of the signaling itself). In accordance with such techniques, a transmitting system may encrypt instances of signaling for transmission using a key (e.g., of a symmetric key pair) known to the transmitting system, and a receiving system may decrypt received instances of such signaling using a key known to the receiving system (e.g., of the same symmetric key pair), which may be the same as the symmetric key known to the transmitting system, or may be otherwise equivalent or operable for such decryption. In some examples, such techniques may support a one-to-one security arrangement, since a symmetric key pair may only be understood to a single transmitting system and a single receiving system (e.g., when a symmetric key pair is based on unique identifiers of each of the transmitting system and the receiving system). However, some cryptographic techniques may support arrangements other than a one-to-one security arrangement, such as when symmetric keys are based on unique identifiers of more than two systems.

Some implementations of the described techniques may utilize asymmetric cryptography where a public key associated with the host system 105-a may be uploaded to one or more memory systems 110 (e.g., the memory system 110-a) without exposing a private key of the host system 105-a, which may prevent an adverse actor from stealing the key and impersonating the real key holder (e.g., impersonating the host system 105-a). Such techniques may also allow a public key to be replaced, which may be different than other techniques such as those related to a RPMB or a replay-protection monotonic counter (RPMC). In some examples, such asymmetric cryptography techniques may facilitate the use of public key infrastructure (PKI) techniques, where keys may be verified through a standardized digital certificate chain.

In some implementations, the exchange of public keys may support the generation of symmetric keys at each of the host system 105-a and the memory system 110-a using such techniques as a Diffie-Hellman key exchange or elliptic-curve techniques, so that a symmetric secret can be shared between device and host without exposing the private keys of the respective systems. In some implementations, an asymmetric Diffie-Hellman key exchange can be performed between the host system 105-a and the memory system 110-a to generate symmetric keys that are then used to enable better performance at the host system 105-a or the memory system 110-a for authentication, encryption, or both. Further, ephemeral symmetric keys can be derived using a same algorithm shared by the host system 105-a and the memory system 110-a to make it more difficult for an adverse actor to extract or replicate such keys, based on various techniques for duration-initiated or event-initiated generation of ephemeral keys.

In some examples, the exchange of public keys may be associated with the creation of digital certificates, which may include various signaling with or other interaction with one or more certificate authorities or registration authorities, or may involve self-signed certificates, or various combinations thereof. For example, the host system 105-a, or a cloud authority or other centralized certification authority in communication with the host system 105-a, may create a certificate signing request (CSR), which may be an example of a self-signed certificate that proves that memory system 110-a has the private key associated with the public key in the CSR. In some examples, such a CSR may be transferred from the memory system 110-a to a centralized certification authority as part of a manufacturing operation (e.g., for manufacturing the memory system 110-a). In some implementations, in response to an identity of the memory system 110-a being confirmed (e.g., by a cloud authority), a manufacturer-endorsed certificate may be provided to the host system 105-a, to the memory system 110-a, or to both. In some examples, such techniques may support a requesting system downloading a manufacturer-endorsed certificate (e.g., a certificate endorsed by a certificate authority) or downloading the CSR.

Figure 3:
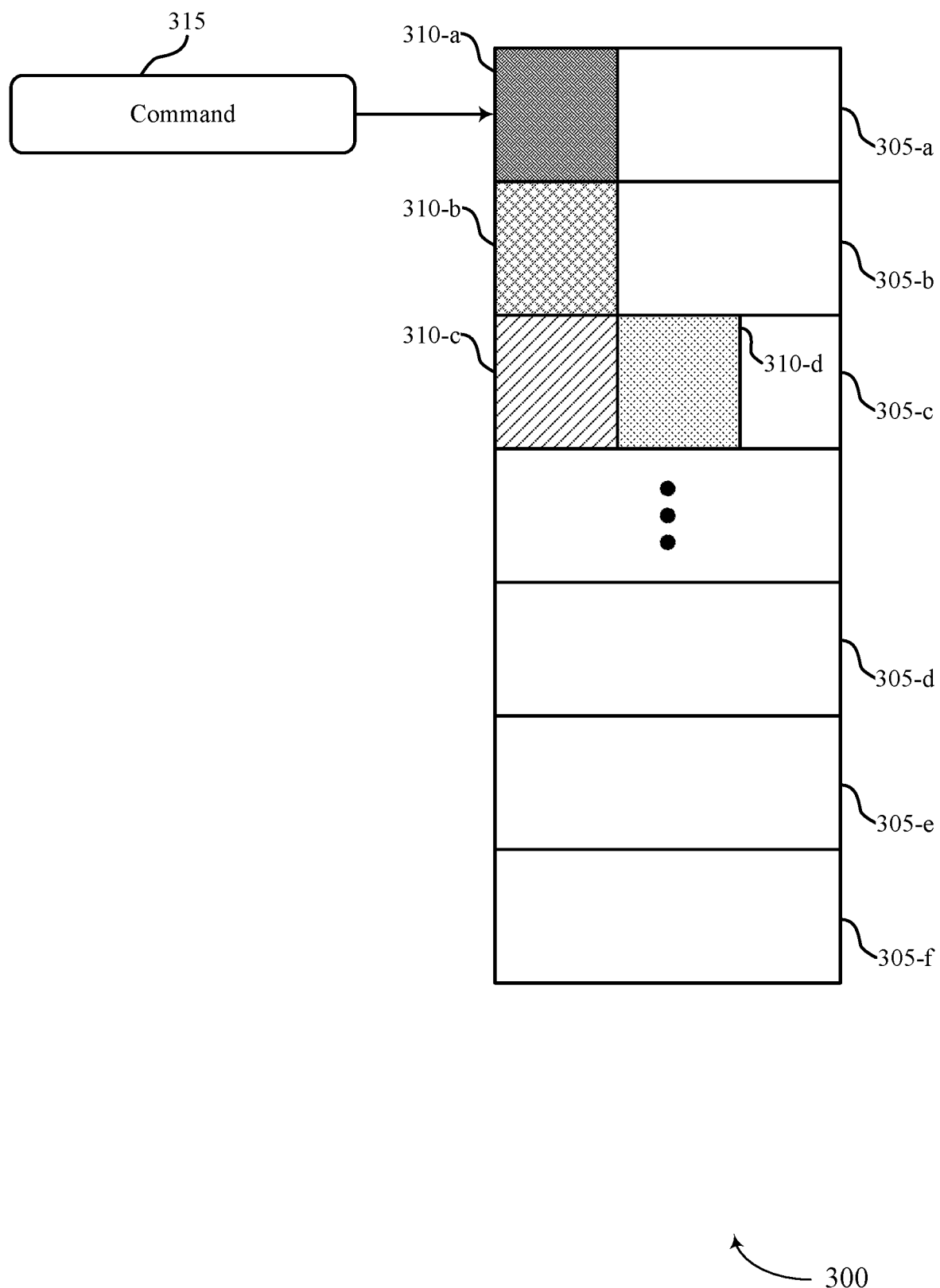
FIG. 3 illustrates an example of a system that supports authenticated modification of memory system data in accordance with examples as disclosed herein.

FIG. 3 illustrates an example of a system 300 that supports authenticated modification of memory system data in accordance with examples as disclosed herein. The system 300 may include one or more regions 305 of a memory system, which may be an example of aspects of a memory system 110 as described with reference to FIGS. 1 and 2. In some cases, each of the one or more regions 305 may be a distinct region or group or memory cells, such as one or more blocks of memory cells, one or more memory dies, or other arrangements of memory cells. The memory cells included in a region 305 may be a continuous region of memory cells, or may be distributed throughout the memory system.

One or more regions 305 (e.g., regions 305-a through 305-c) may be a protection region, such as a write-protect group. For example, the region 305-a may be a protection region associated with or corresponding to a key 310-a. The key 310-a may be a key associated with a host system or host entity, such a host system 105 or a host entity 210 as described with reference to FIGS. 1 and 2. In some cases, different host entities may use different keys. For example, a first host entity may be authorized to access the protection region 305-a, and accordingly, the first host entity may use the key 310-a to sign commands to program data to the protection region 305-a. Similarly, a second host entity may be authorized to access a protection region 305-b, and accordingly, the second host entity may use the key 310-b to sign commands to program data to the protection region 305-b.

In some examples, multiple host entities may be authorized to access a same region 305. For example, a protection region 305-c may be associated with multiple keys 310, such as a key 310-c associated with a third host entity authorized to access the protection region 305-c and a key 310-d associated with a fourth host entity authorized to access the protection region 305-c. In some cases, a single host entity may be associated with or use multiple keys 310, and thus may be authorized to access multiple protection regions 305 of the memory system. Additionally or alternatively, a single host entity may use a same key 310 to access multiple protection regions 305 of the memory system. In some examples, a host entity may change permissions (e.g., authorize additional host entities, or remove the protection) for a protection region 305 using a command 315 signed using a corresponding key 310.

In some cases, the host system and the memory system may use one or more symmetric key pairs. In such cases, both the host system and the memory system may store a shared key 310. For example, if a host entity is authorized to access the protection region 305-a, the host system may store the key 310-a in a key storage at the host system (e.g., a key storage 215 as described with reference to FIG. 2).

Similarly, the memory system may also store the key 310-*a* in a key storage at the memory system (e.g., a key storage 250 as described with reference to FIG. 2). In some cases, the memory system may associate the key 310-*a* with the host entity, for example in a public key table (e.g., a public key table 260 as described with reference to FIG. 2), so that the memory system may verify commands sent from the host system.

Additionally or alternatively, the host system and the memory system may use asymmetric key pairs. In such cases, the host system may store a private key associated with a protection region 305, and the memory system may store a public key of the host system. For example, if a host entity is authorized to access the protection region 305-*a*, the host system may store the private key associated with the protection region 305-*a* in the host system key storage and transmit the corresponding public key to the memory system. The memory system may store the public key in the memory system key storage. In some cases, the key 310-*a* may be the public key received from the host system.

According to the techniques described herein, the host system may transmit a command 315 to program data to a protection region 305 of the memory system, and the host system may sign the command 315 using a key 310 associated with the protection region 305. In some examples, the host system may concurrently transmit the data to be programmed with the command 315. For example, the host system may program the protection region 305-*a* directly with data that is supplied with the command 315 signed using the corresponding key 310-*a*. Additionally or alternatively, the command 315 may include instructions to move data from another region 305 (e.g., from one or more of unprotection regions 305-*d* through 305-*f*). For example, the command 315, signed with the key 310-*b*, may include instructions to move data from an unprotection region 305-*d* to the protection region 305-*b*. In some examples, based on the command 315, the memory system may atomically move the data, where the memory system may add the data to the protection region 305-*b* and concurrently protect the data using the key 310-*b*.

Figure 4:
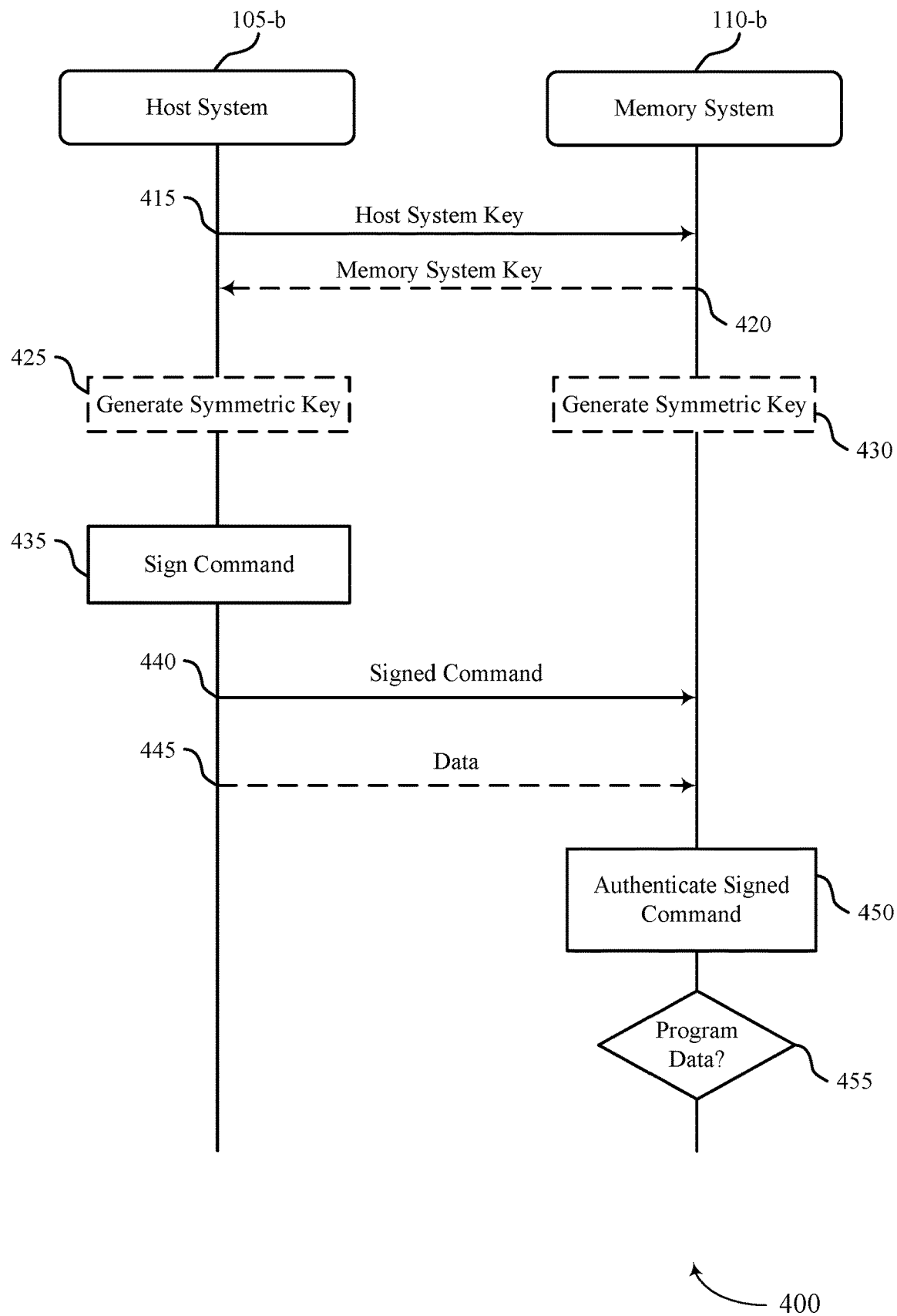
FIG. 4 illustrates an example of a process flow that supports authenticated modification of memory system data in accordance with examples as disclosed herein.

FIG. 4 illustrates an example of a process flow 400 that supports authenticated modification of memory system data in accordance with examples as disclosed herein. The process flow 400 may be implemented by a host system 105-*b*, for example using a host system controller, and by a memory system 110-*b*, for example using a controller, which may be examples of corresponding devices described with reference to FIGS. 1 and 2. The memory system 110-*b* may be an example of an eMMC system. In the following description of process flow 400, the operations may be performed in a different order than the order shown. For example, specific operations may also be left out of process flow 400, or other operations may be added to process flow 400.

In some examples, the process flow 400 may include a generation of public keys that may be communicated between the host system 105-*b* and the memory system 110-*b*, which may be referred to as asymmetric keys or asymmetric public keys (e.g., public keys of an asymmetric key pair, public keys that each correspond to a respective private key of an asymmetric key pair). The generation of such public keys may be based on private keys maintained at the respective system, where such private keys are not shared outside the respective system. Such techniques may enable the host system 105-*b* and the memory system 110-*b* to sign various transmitted signaling (e.g., for authenticating a transmitting system), or to encrypt various transmitted signaling (e.g., for information integrity), or both without the exchange of private identification information unique to each system. Accordingly, such techniques may improve an ability to communicate with authenticity and integrity compared with other techniques where the distribution of cryptographic hardware identification information is not performed, or where such distribution may be more vulnerable to being cloned or stolen, such as techniques that distribute symmetric keys in a manner that may be insecure.

For example, the host system 105-*b* may generate a host system public key, which may be based at least in part on (e.g., calculated using) a host system private key. In various examples, the host system private key may be stored at or otherwise generated at the host system 105-*b* using a private identifier such as a fuse configuration, an identity stored in non-volatile memory, a PUF of the host system 105-*b*, or some other unique identifier of the host system 105-*b*, which may be protected from being cloned or extracted. In some examples, the host system public key may be associated with a particular host entity, or a particular range of addresses at the memory system 110-*b* (e.g., a partition, or a portion thereof), or a memory protection attribute (e.g., read protection, write-protection), or a combination thereof. In some examples, such public key attributes may not be associated with the host system public key generated, but may be later associated with one or more symmetric keys that are generated based at least in part on the host system public key, or may be later assigned by the memory system 110-*a*.

In some examples, the process flow 400 may include an exchange of one or more keys between the host system 105-*b* and the memory system 110-*b*. For example, at 415, the host system 105-*b* may transmit one or more keys associated with respective protection regions of the memory system 110-*b*, which may be received by the memory system 110-*b*. In some examples, (e.g., when the host system 105-*b* and the memory system 110-*b* are configured to support symmetric keys, encryption, or both), at 420, the memory system 110-*b* may transmit one or more public keys for the memory system 110-*b*, which may be received by the host system 105-*b*. In some examples, the transmitted public keys may be stored at the respective receiving system (e.g., in key storage 215, in key storage 250), such as being stored in a non-volatile storage of or otherwise in communication with the respective receiving system. In some other examples, such transmitted or received public keys may not be stored, but keys generated based on such transmitted or received public keys may be stored upon further processing. In some examples, such asymmetric public keys may be updatable, where such updating may be initiated based on a timer or event, and such updated or superseding asymmetric public keys that are subsequently generated may accordingly be transmitted from a generating system to a receiving system.

In some examples, the process flow 400 may include a generation of symmetric keys by the host system 105-*b* and the memory system 110-*b*, which may be calculated based at least in part on the respectively received public keys. Such symmetric keys may be generated to be equal or otherwise equivalent between the two systems (e.g., as a shared secret), or otherwise operable to for one to be used to authenticate information that has been signed using the other, or for one to be used to decode information that has been encoded using the other, or both, despite avoiding the transmission of private information. For example, at 425, the host system 105-*b* may generate a symmetric key, which may be based at least in part on (e.g., calculated using) the one or more keys transmitted by the memory system 110-*b* at 420, and the one or more keys of the host system 105-*b*. Further, at 430, the memory system 110-*b* also may generate a symmetric key, which may be based at least in part on (e.g., calculated using) the one or more keys transmitted by the host system 105-*b* at 415 and the one or more keys of the memory system 110-*b*. In some examples, such symmetric keys may be generated using Diffie-Hellmann techniques or other exponential key exchange or generation protocol, including elliptic-curve techniques. In some examples, the generated symmetric keys may be stored at the generating system (e.g., in a key storage), such as being stored in a non-volatile storage of or otherwise in communication with the respective generating system.

The process flow 400 may describe transmitting a command from the host system 105-*b* to the memory system 110-*b* to program data to one or more protection regions of the memory system 110-*b*. At 435, the command may be signed. For example, the host system 105-*b* may generate a signed command to program data to a protection region of the memory system 110-*b* (e.g., a protection region 305 as described with reference to FIG. 3), such as a modify command. In some cases, generating the signed command may include generating a signature by performing a hash procedure using a key associated with the protection region of the memory system 110-*b* and the command and including the signature in the command. Accordingly, the signed command may include a modify command (e.g., the command to program data at the memory system 110-*b*) and the signature generated using the hash procedure.

At 440, the signed command may be transmitted to the memory system 110-*b*. For example, the host system 105-*b* may transmit the signed command to the memory system 110-*b*. In some examples, the host system 105-*b* may additionally transmit an indication that the signed command has been signed to the memory system 110-*b*. For example, the host system 105-*b* may adjust a state of a channel between the host system 105-*b* and the memory system 110-*b* to indicated that the signed command is signed. In some examples, at 445, the data to be programmed may be transmitted. For example, the host system 105-*b* may concurrently transmit the data to be programmed with the command. Additionally or alternatively, the command may include instructions to move data from another region (e.g., an unprotected region) of the memory system 110-*b* to the protection region.

At 450, the signed command may be authenticated. For example, the memory system 110-*b* may authenticate the signed command using the included signature. In some cases, authenticating the signed command may include performing a hash procedure or otherwise translating the signature included in the signed command using the key associated with the read-protection region of the memory system 110-*b* to determine the identity of the host system 105-*b*. In some cases, the identity of the host system 105-*b* may include an indication of a host entity which initiated the command, such as a host entity 210 described with reference to FIG. 2.

In some cases, the key associated with the protection region of the memory system may be a key stored by the host system 105-*b* (e.g., in the key storage 215, as described with reference to FIG. 2), such a private key for the host system 105-*b*, which may be paired with a public key of the host system 105-*b* (e.g., the private key and the public key may be part of an asymmetric key pair). The host system may transmit the public key to the memory system 110-*b*, for example over a virtual authenticated channel 205 as described with reference to FIG. 2. In such cases, the host system 105-*b* may encrypt the command at 435 using the private key for the host system 105-*b*. Accordingly, the memory system 110-*b* may authenticate the command at 450 using a public key for the host system 105-*b*.

Additionally or alternatively, the key associated with the protection region of the shared key stored by the host system 105-*b* (e.g., in the key storage 250, as described with reference to FIG. 2), which may be shared with a key of the memory system 110-*b* (e.g., the key of the host system 105-*b* and the key of the memory system 110-*b* may be part of a symmetric key pair). The host system may transmit the shared key to the memory system 110-*b*, for example over a virtual authenticated channel 205 as described with reference to FIG. 2. In such cases, the host system 105-*b* may encrypt the command at 440 using the shared key. Accordingly, the memory system 110-*b* may authenticate the command at 450 using a shared key.

At 455, it may be determined whether the host system 105-*b* is authorized to program data to the protection region of the memory system 110-*b*. For example, the memory system 110-*b* may determine whether the signature of the signed command matches a signature generated by the hash procedure performed at 450. If the received signature and the generated signature match, the memory system 110-*b* may determine that the host system 105-*b* is authorized to access the protection region. In such cases, the memory system 110-*b* may program the data to the protection region as requested by the host system 105-*b*.

Additionally or alternatively, the memory system at 450 may determine that the signature of the received signed command does not match the signature generated using the hash procedure performed at 450. For example, the command may have been signed using a key associated with a different protection region (e.g., a second protection region). In such cases, the memory system 110-*b* may refrain from programming the data to the protection region.

In some cases, the host system 105-*b* may update the key associated with the read-protection region. For example, the host system 105-*b* may generate a second key associated with the read-protection region of the memory system 110-*b* and transmit the second key to the memory system 110-*b*. Accordingly, the memory system 110-*b* may update the associated with the read-protection region, for example by updating the key storage 250, the public key table 260, or both, as described with reference to FIG. 2. In some cases, the host system 105-*b* may update the key associated with the read protection region after an elapsed time period (e.g., a cryptoperiod).

In some cases, one or more protection regions of the memory system 110-*b* may be updated. For example, the memory system 110-*b* may adjust the size of one or more protection regions, such as by including more or fewer memory cells in an adjusted protection region. Additionally or alternatively, the memory system 110-*b* may adjust an address range of one or more protection regions. For example, as part of adjusting a protection region from a first address range to a second address range, the memory system 110-*b* may transfer data (e.g., read-protected data or write-protected data) stored at the first address range to the second address range. In some cases, an updated protection region may be associated with a same key before and after being updated. In some cases, the host system 105-*b* may transmit a command to the memory system 110-*b* to update one or more protection regions.

Aspects of the process flow 400 may be implemented by a controller, among other components. Additionally or alternatively, aspects of the process flow 400 may be implemented as instructions stored in memory (e.g., firmware stored in a memory coupled with the memory system 110-*b*, the host system 105-*b*, or both). For example, the instructions, when executed by a controller, may cause the controller to perform the operations of the process flow 400.

Figure 5:
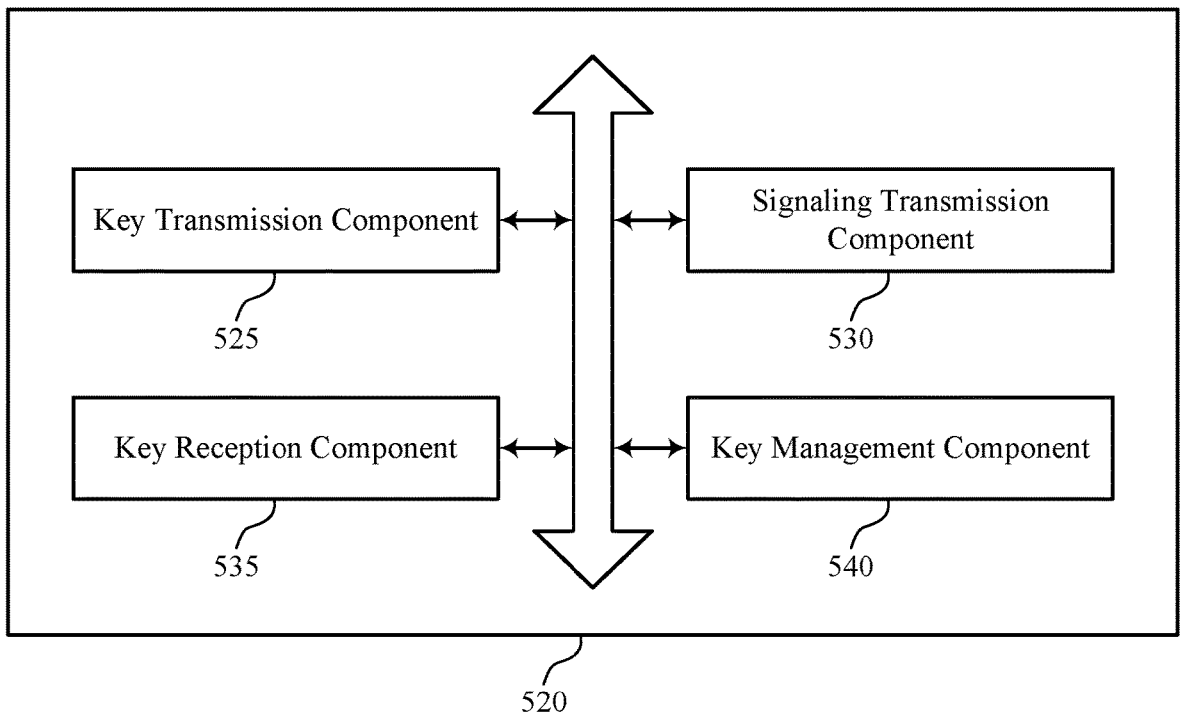
FIG. 5 shows a block diagram of a host system that supports authenticated modification of memory system data in accordance with examples as disclosed herein.

FIG. 5 shows a block diagram 500 of a host system 520 that supports authenticated modification of memory system data in accordance with examples as disclosed herein. The host system 520 may be an example of aspects of a host system as described with reference to FIGS. 1 through 4. The host system 520, or various components thereof, may be an example of means for performing various aspects of authenticated modification of memory system data as described herein. For example, the host system 520 may include a key transmission component 525, a signaling transmission component 530, a key reception component 535, a key management component 540, or any combination thereof. Each of these components may communicate, directly or indirectly, with one another (e.g., via one or more buses).

The key transmission component 525 may be configured as or otherwise support a means for transmitting, by a host system for a memory system, one or more keys associated with the host system, where each of the one or more transmitted keys associated with the host system is for association with a respective protection region of one or more protection regions at the memory system. The signaling transmission component 530 may be configured as or otherwise support a means for transmitting, by the host system, a signed command to program data to a first protection region of one or more protection regions at the memory system, where. In some examples, the signed command is signed based at least in part on a counterpart key associated with the host system and corresponding to a first transmitted key of the one or more transmitted keys associated with the host system, and the first protection region is associated with the first transmitted key associated with the host system.

In some examples, the key reception component 535 may be configured as or otherwise support a means for receiving, at the host system, one or more public keys associated with the memory system, where. In some examples, the counterpart key includes a private key associated with the host system, each of the one or more received public keys associated with the memory system corresponds to a respective private key associated with the memory system and is different than each of the one or more transmitted keys associated with the host system, and the signed command is signed further based at least in part on a first received public key of the one or more received public keys associated with the memory system.

In some examples, the key management component 540 may be configured as or otherwise support a means for generating a symmetric key based at least in part on the first private key associated with the host system and the first received public key associated with the memory system, where the signed command is signed based at least in part on the generated symmetric key.

In some examples, the signaling transmission component 530 may be configured as or otherwise support a means for transmitting, by the host system, a second signed command to program second data to a second protection region of the one or more protection regions at the memory system, where. In some examples, the second signed command is signed based at least in part on a second counterpart key associated with the host system and corresponding to a second transmitted key of the one or more transmitted keys associated with the host system, and the second protection region is associated with the second transmitted key associated with the host system.

In some examples, the first transmitted key associated with the host system and the second transmitted key associated with the host system are a same key. In some examples, the first protection region is different than the second protection region.

In some examples, the first transmitted key associated with the host system is different than the second transmitted key associated with the host system. In some examples, the first protection region and the second protection region are a same protection region.

In some examples, the first transmitted key associated with the host system is different than the second transmitted key associated with the host system. In some examples, the first protection region is different than the second protection region.

In some examples, the key transmission component 525 may be configured as or otherwise support a means for transmitting, by the host system, an updated key associated with the host system, where the first protection region at the memory system is associated with the updated key based at least in part on transmitting the updated key. In some examples, the signaling transmission component 530 may be configured as or otherwise support a means for transmitting, by the host system, a second signed command to program second data to the first protection region at the memory system, where the second signed command is signed based at least in part on a counterpart key corresponding to the updated key.

In some examples, the signaling transmission component 530 may be configured as or otherwise support a means for transmitting the data in association with the signed command to program the data to the first protection region.

In some examples, the signed command to program the data to the first protection region includes instructions to move the data to the first protection region from a storage location at the memory system outside the first protection region.

In some examples, the signaling transmission component 530 may be configured as or otherwise support a means for transmitting, to the memory system, an indication of a size of the first protection region, an address range corresponding to the first protection region, or any combination thereof.

Figure 6:
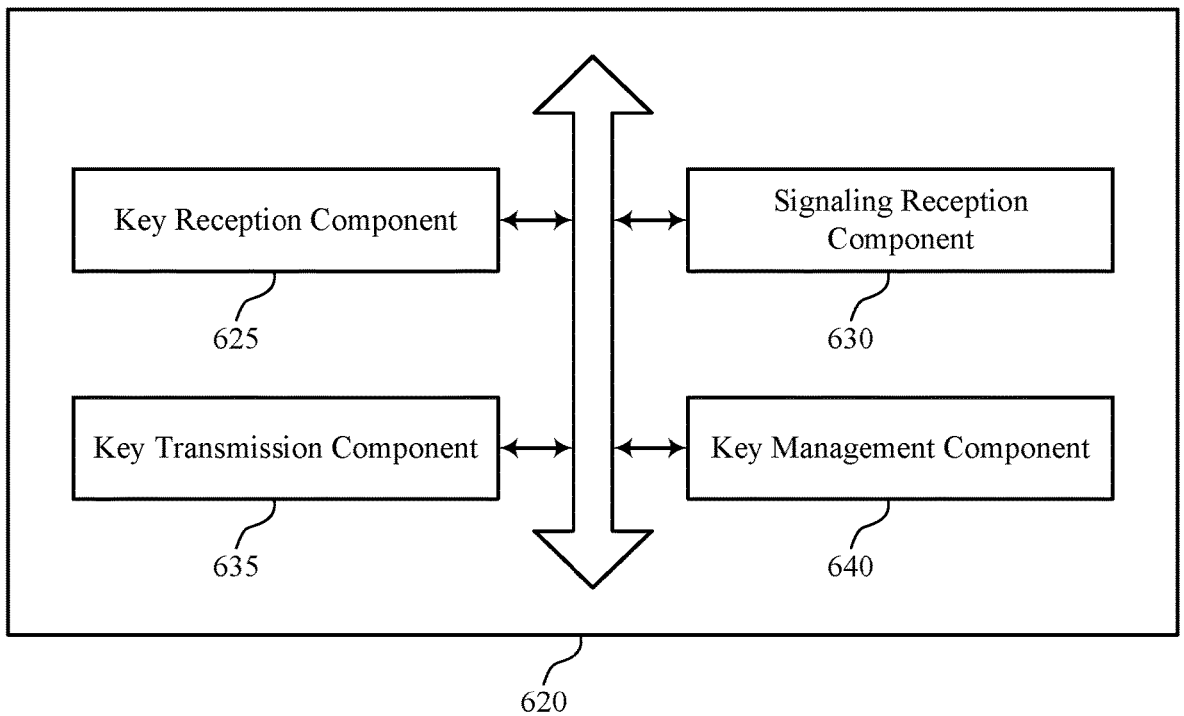
FIG. 6 shows a block diagram of a memory system that supports authenticated modification of memory system data in accordance with examples as disclosed herein.

FIG. 6 shows a block diagram 600 of a memory system 620 that supports authenticated modification of memory system data in accordance with examples as disclosed herein. The memory system 620 may be an example of aspects of a memory system as described with reference to FIGS. 1 through 4. The memory system 620, or various components thereof, may be an example of means for performing various aspects of authenticated modification of memory system data as described herein. For example, the memory system 620 may include a key reception component 625, a signaling reception component 630, a key transmission component 635, a key management component 640, or any combination thereof. Each of these components may communicate, directly or indirectly, with one another (e.g., via one or more buses).

The key reception component 625 may be configured as or otherwise support a means for receiving, at a memory system from a host system, one or more keys associated with the host system, where each of the one or more received keys associated with the host system corresponds to a respective counterpart key associated with the host system and is for association with a respective protection region of one or more protection regions at the memory system. The signaling reception component 630 may be configured as or otherwise support a means for receiving, at the memory system, a signed command to program data to a first protection region of one or more protection regions at the memory system. In some examples, the signaling reception component 630 may be configured as or otherwise support a means for determining whether to program the data to the first protection region based at least in part on attempting to decrypt a signature of the signed command, where. In some examples, attempting to decrypt the signature of the signed command may be based at least in part on a first received key of the one or more received keys associated with the host system, and the first protection region may be associated with the first received key associated with the host system.

In some examples, the key transmission component 635 may be configured as or otherwise support a means for transmitting, by the memory system to the host system, one or more public keys associated with the memory system, where. In some examples, each of the one or more transmitted public keys associated with the memory system corresponds to a respective private key associated with the memory system and is different than each of the one or more received keys associated with the host system, and attempting to decrypt the signature of the signed command is further based at least in part on a first private key associated with the memory system.

In some examples, the key management component 640 may be configured as or otherwise support a means for generating a symmetric key based at least in part on the first received key associated with the host system and the first private key associated with the memory system, where attempting to decrypt the signature of the signed command is based at least in part on the generated symmetric key.

In some examples, the signaling reception component 630 may be configured as or otherwise support a means for receiving, at the memory system, a second signed command to program second data to a second protection region of the one or more protection regions at the memory system. In some examples, the signaling reception component 630 may be configured as or otherwise support a means for determining whether to program the second data to the second protection region based at least in part on attempting to decrypt a signature of the second signed command, where. In some examples, attempting to decrypt the signature of the second signed command is based at least in part on a second received key of the one or more received keys associated with the host system, and the second protection region is associated with the second received key associated with the host system.

In some examples, the first received key associated with the host system and the second received key associated with the host system are a same key. In some examples, the first protection region is different than the second protection region.

In some examples, the first received key associated with the host system is different than the second received key associated with the host system. In some examples, the first protection region and the second protection region are a same protection region.

In some examples, the first received key associated with the host system is different than the second received key associated with the host system. In some examples, the first protection region is different than the second protection region.

In some examples, the key reception component 625 may be configured as or otherwise support a means for receiving, at the memory system, an updated key associated with the host system. In some examples, the key management component 640 may be configured as or otherwise support a means for associating the first protection region at the memory system with the updated key based at least in part on receiving the updated key. In some examples, the signaling reception component 630 may be configured as or otherwise support a means for receiving, at the memory system, a second signed command to program second data to the first protection region at the memory system. In some examples, the signaling reception component 630 may be configured as or otherwise support a means for determining whether to program the second data to the first protection region based at least in part on attempting to decrypt a signature of the second signed command, where attempting to decrypt the signature of the second signed command is based at least in part on the updated key.

In some examples, the signaling reception component 630 may be configured as or otherwise support a means for receiving the data in association with the signed command to program the data to the first protection region.

In some examples, the signed command to program the data to the first protection region includes instructions to move the data to the first protection region from a storage location at the memory system outside the first protection region.

In some examples, the signaling reception component 630 may be configured as or otherwise support a means for receiving, from the host system, an indication of a size of the first protection region, an address range corresponding to the first protection region, or any combination thereof.

Figure 7:
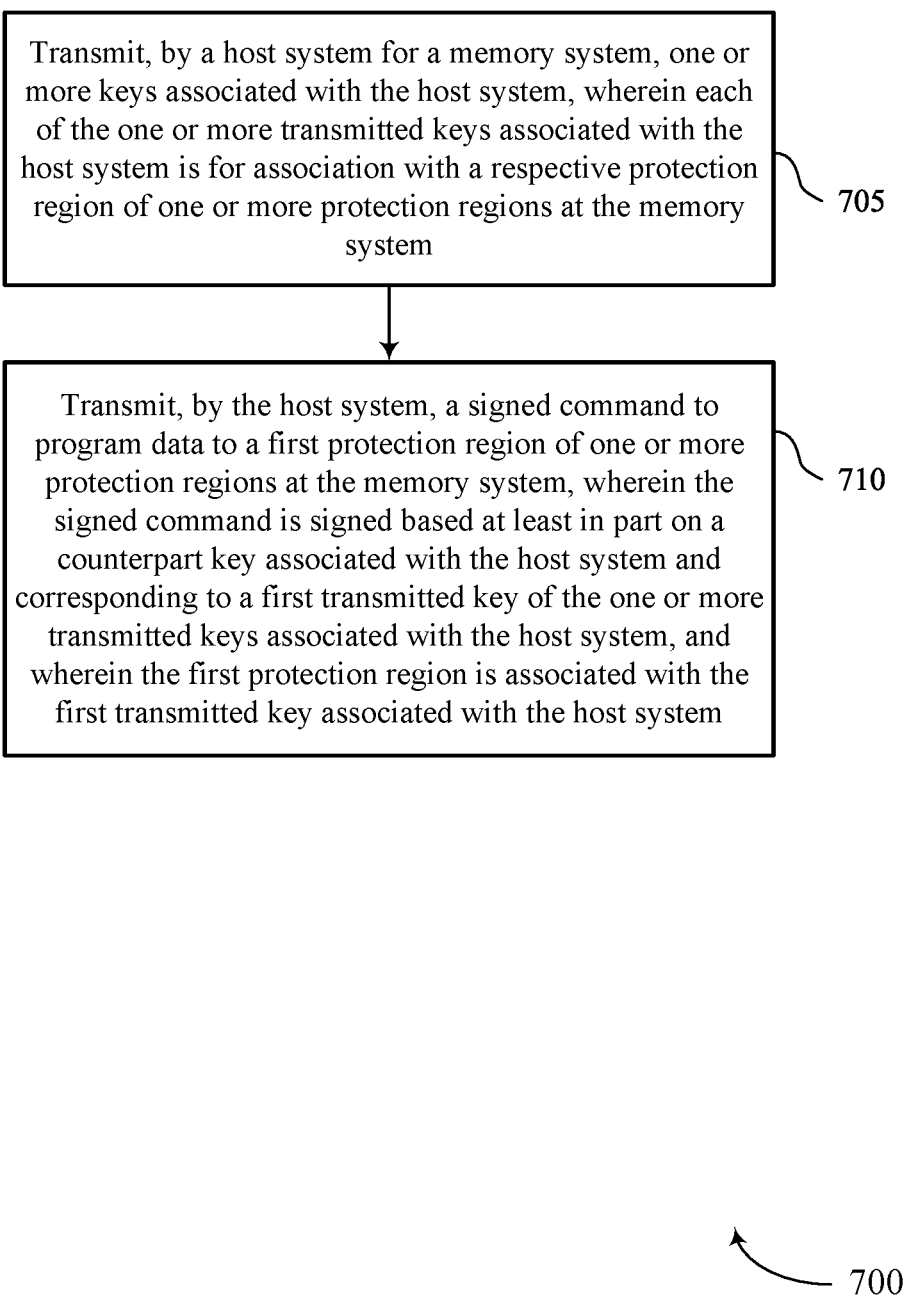
FIGS. 7 and 8 show flowcharts illustrating a method or methods that support authenticated modification of memory system data in accordance with examples as disclosed herein.

FIG. 7 shows a flowchart illustrating a method 700 that supports authenticated modification of memory system data in accordance with examples as disclosed herein. The operations of method 700 may be implemented by a host system or its components as described herein. For example, the operations of method 700 may be performed by a host system as described with reference to FIGS. 1 through 5. In some examples, a host system may execute a set of instructions to control the functional elements of the device to perform the described functions. Additionally or alternatively, the host system may perform aspects of the described functions using special-purpose hardware.

At 705, the method may include transmitting, by a host system for a memory system, one or more keys associated with the host system, where each of the one or more transmitted keys associated with the host system is for association with a respective protection region of one or more protection regions at the memory system. The operations of 705 may be performed in accordance with examples as disclosed herein. In some examples, aspects of the operations of 705 may be performed by a key transmission component 525 as described with reference to FIG. 5.

At 710, the method may include transmitting, by the host system, a signed command to program data to a first protection region of one or more protection regions at the memory system, where. In some examples, the signed command may be signed based on a counterpart key associated with the host system and corresponding to a first transmitted key of the one or more transmitted keys associated with the host system, and the first protection region may be associated with the first transmitted key associated with the host system. The operations of 710 may be performed in accordance with examples as disclosed herein. In some examples, aspects of the operations of 710 may be performed by a signaling transmission component 530 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: A method or apparatus, including operations, features, circuitry, logic, means, or instructions, or any combination thereof for transmitting, by a host system for a memory system, one or more keys associated with the host system, wherein each of the one or more transmitted keys associated with the host system is for association with a respective protection region of one or more protection regions at the memory system; and transmitting, by the host system, a signed command to program data to a first protection region of one or more protection regions at the memory system, wherein: the signed command is signed based at least in part on a counterpart key associated with the host system and corresponding to a first transmitted key of the one or more transmitted keys associated with the host system; and the first protection region is associated with the first transmitted key associated with the host system.

Aspect 2: The method or apparatus of aspect 1, further including operations, features, circuitry, logic, means, or instructions, or any combination thereof for receiving, at the host system, one or more public keys associated with the memory system, wherein: the counterpart key includes a private key associated with the host system, each of the one or more received public keys associated with the memory system corresponds to a respective private key associated with the memory system and is different than each of the one or more transmitted keys associated with the host system, and the signed command is signed further based at least in part on a first received public key of the one or more received public keys associated with the memory system.

Aspect 3: The method or apparatus of aspect 2, further including operations, features, circuitry, logic, means, or instructions, or any combination thereof for generating a symmetric key based at least in part on the first private key associated with the host system and the first received public key associated with the memory system, where the signed command is signed based at least in part on the generated symmetric key.

Aspect 4: The method or apparatus of any of aspects 1 through 3, further including operations, features, circuitry, logic, means, or instructions, or any combination thereof for transmitting, by the host system, a second signed command to program second data to a second protection region of the one or more protection regions at the memory system, wherein: the second signed command is signed based at least in part on a second counterpart key associated with the host system and corresponding to a second transmitted key of the one or more transmitted keys associated with the host system and the second protection region is associated with the second transmitted key associated with the host system.

Aspect 5: The method or apparatus of aspect 4, further including operations, features, circuitry, logic, means, or instructions, or any combination thereof for the first transmitted key associated with the host system and the second transmitted key associated with the host system are a same key and the first protection region is different than the second protection region.

Aspect 6: The method or apparatus of any of aspects 4 through 5, further including operations, features, circuitry, logic, means, or instructions, or any combination thereof for the first transmitted key associated with the host system is different than the second transmitted key associated with the host system and the first protection region and the second protection region are a same protection region.

Aspect 7: The method or apparatus of any of aspects 4 through 6, further including operations, features, circuitry, logic, means, or instructions, or any combination thereof for the first transmitted key associated with the host system is different than the second transmitted key associated with the host system and the first protection region is different than the second protection region.

Aspect 8: The method or apparatus of any of aspects 1 through 7, further including operations, features, circuitry, logic, means, or instructions, or any combination thereof for transmitting, by the host system, an updated key associated with the host system, where the first protection region at the memory system is associated with the updated key based at least in part on transmitting the updated key and transmitting, by the host system, a second signed command to program second data to the first protection region at the memory system, where the second signed command is signed based at least in part on a counterpart key corresponding to the updated key.

Aspect 9: The method or apparatus of any of aspects 1 through 8, further including operations, features, circuitry, logic, means, or instructions, or any combination thereof for transmitting the data in association with the signed command to program the data to the first protection region.

Aspect 10: The method or apparatus of any of aspects 1 through 9, further including operations, features, circuitry, logic, means, or instructions, or any combination thereof for the signed command to program the data to the first protection region includes instructions to move the data to the first protection region from a storage location at the memory system outside the first protection region.

Aspect 11: The method or apparatus of any of aspects 1 through 10, further including operations, features, circuitry, logic, means, or instructions, or any combination thereof for transmitting, to the memory system, an indication of a size of the first protection region, an address range corresponding to the first protection region, or any combination thereof.

Figure 8:
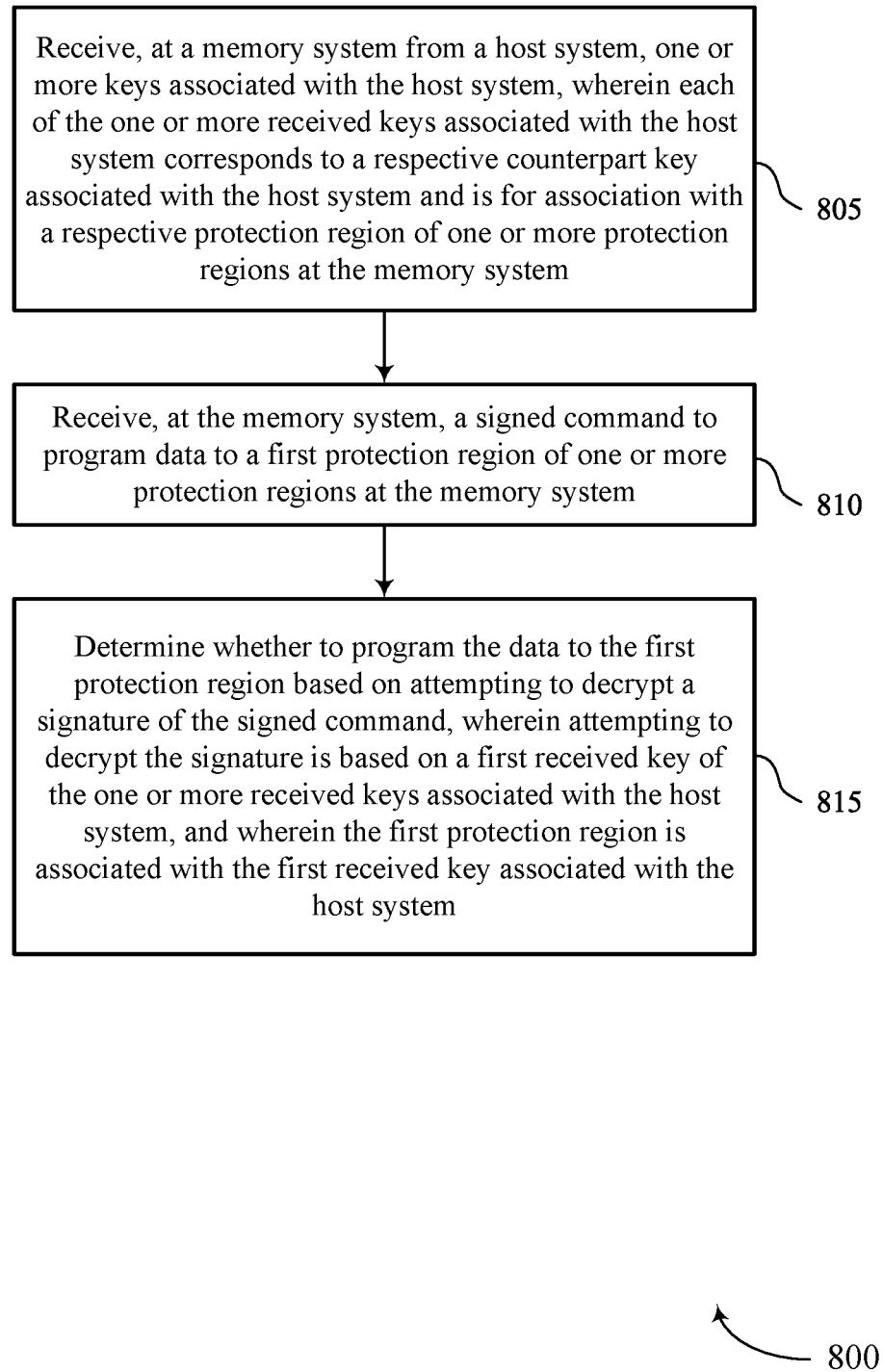

FIG. 8 shows a flowchart illustrating a method 800 that supports authenticated modification of memory system data in accordance with examples as disclosed herein. The operations of method 800 may be implemented by a memory system or its components as described herein. For example, the operations of method 800 may be performed by a memory system as described with reference to FIGS. 1 through 4 and 6. In some examples, a memory system may execute a set of instructions to control the functional elements of the device to perform the described functions. Additionally or alternatively, the memory system may perform aspects of the described functions using special-purpose hardware.

At 805, the method may include receiving, at a memory system from a host system, one or more keys associated with the host system, where each of the one or more received keys associated with the host system corresponds to a respective counterpart key associated with the host system and is for association with a respective protection region of one or more protection regions at the memory system. The operations of 805 may be performed in accordance with examples as disclosed herein. In some examples, aspects of the operations of 805 may be performed by a key reception component 625 as described with reference to FIG. 6.

At 810, the method may include receiving, at the memory system, a signed command to program data to a first protection region of one or more protection regions at the memory system. The operations of 810 may be performed in accordance with examples as disclosed herein. In some examples, aspects of the operations of 810 may be performed by a signaling reception component 630 as described with reference to FIG. 6.

At 815, the method may include determining whether to program the data to the first protection region based at least in part on attempting to decrypt a signature of the signed command, where. In some examples, attempting to decrypt the signature of the signed command may be based on a first received key of the one or more received keys associated with the host system, and the first protection region may be associated with the first received key associated with the host system. The operations of 815 may be performed in accordance with examples as disclosed herein. In some examples, aspects of the operations of 815 may be performed by a signaling reception component 630 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 12: A method or apparatus, including operations, features, circuitry, logic, means, or instructions, or any combination thereof for receiving, at a memory system from a host system, one or more keys associated with the host system, where each of the one or more received keys associated with the host system corresponds to a respective counterpart key associated with the host system and is for association with a respective protection region of one or more protection regions at the memory system; receiving, at the memory system, a signed command to program data to a first protection region of one or more protection regions at the memory system; and determining whether to program the data to the first protection region based at least in part on attempting to decrypt a signature of the signed command, wherein: attempting to decrypt the signature of the signed command is based at least in part on a first received key of the one or more received keys associated with the host system; and the first protection region is associated with the first received key associated with the host system.

Aspect 13: The method or apparatus of aspect 12, further including operations, features, circuitry, logic, means, or instructions, or any combination thereof for transmitting, by the memory system to the host system, one or more public keys associated with the memory system, wherein: each of the one or more transmitted public keys associated with the memory system corresponds to a respective private key associated with the memory system and is different than each of the one or more received keys associated with the host system; and attempting to decrypt the signature of the signed command is further based at least in part on a first private key associated with the memory system.

Aspect 14: The method or apparatus of aspect 13, further including operations, features, circuitry, logic, means, or instructions, or any combination thereof for generating a symmetric key based at least in part on the first received key associated with the host system and the first private key associated with the memory system, where attempting to decrypt the signature of the signed command is based at least in part on the generated symmetric key.

Aspect 15: The method or apparatus of any of aspects 12 through 14, further including operations, features, circuitry, logic, means, or instructions, or any combination thereof for receiving, at the memory system, a second signed command to program second data to a second protection region of the one or more protection regions at the memory system and determining whether to program the second data to the second protection region based at least in part on attempting to decrypt a signature of the second signed command, wherein: attempting to decrypt the signature of the second signed command is based at least in part on a second received key of the one or more received keys associated with the host system; and the second protection region is associated with the second received key associated with the host system.

Aspect 16: The method or apparatus of aspect 15, further including operations, features, circuitry, logic, means, or instructions, or any combination thereof for the first received key associated with the host system and the second received key associated with the host system are a same key and the first protection region is different than the second protection region.

Aspect 17: The method or apparatus of any of aspects 15 through 16, further including operations, features, circuitry, logic, means, or instructions, or any combination thereof for the first received key associated with the host system is different than the second received key associated with the host system and the first protection region and the second protection region are a same protection region.

Aspect 18: The method or apparatus of any of aspects 15 through 17, further including operations, features, circuitry, logic, means, or instructions, or any combination thereof for the first received key associated with the host system is different than the second received key associated with the host system and the first protection region is different than the second protection region.

Aspect 19: The method or apparatus of any of aspects 12 through 18, further including operations, features, circuitry, logic, means, or instructions, or any combination thereof for receiving, at the memory system, an updated key associated with the host system; associating the first protection region at the memory system with the updated key based at least in part on receiving the updated key; receiving, at the memory system, a second signed command to program second data to the first protection region at the memory system; and determining whether to program the second data to the first protection region based at least in part on attempting to decrypt a signature of the second signed command, where attempting to decrypt the signature of the second signed command is based at least in part on the updated key.

Aspect 20: The method or apparatus of any of aspects 12 through 19, further including operations, features, circuitry, logic, means, or instructions, or any combination thereof for receiving the data in association with the signed command to program the data to the first protection region.

Aspect 21: The method or apparatus of any of aspects 12 through 20, further including operations, features, circuitry, logic, means, or instructions, or any combination thereof for the signed command to program the data to the first protection region includes instructions to move the data to the first protection region from a storage location at the memory system outside the first protection region.

Aspect 22: The method or apparatus of any of aspects 12 through 21, further including operations, features, circuitry, logic, means, or instructions, or any combination thereof for receiving, from the host system, an indication of a size of the first protection region, an address range corresponding to the first protection region, or any combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A host system, comprising:
  processing circuitry configured to cause the host system to:
    transmit, to a memory system, one or more public keys associated with the host system, wherein each key of the one or more public keys associated with the host system is for access to a respective protection region of one or more protection regions at the memory system, each protection region of the one or more protection regions comprising a respective set of memory cells protected by at least two keys;
    receive one or more public keys associated with the memory system, wherein each public key of the one or more public keys associated with the memory system corresponds to a respective private key associated with the memory system and is different than each of the one or more public keys associated with the host system;
    generate a symmetric key in accordance with a private key associated with the host system and a first received public key of the one or more public keys associated with the memory system, wherein the private key associated with the host system corresponds to a first public key of the one or more public keys associated with the host system; and
    transmit a signed command to program data to a first set of memory cells within a first protection region of the one or more protection regions at the memory system, wherein:
      the signed command is signed based at least in part on the generated symmetric key; and
      the at least two keys for protection of the first set of memory cells within the first protection region comprise the generated symmetric key and a private key associated with the memory system and the first set of memory cells.

2. The host system of claim 1, wherein the processing circuitry is further configured to cause the host system to:

transmit a second signed command to program second data to a second protection region of the one or more protection regions at the memory system, wherein:
the second signed command is signed based at least in part on a second private key associated with the host system and corresponding to a second public key of the one or more public keys associated with the host system; and
the second protection region is associated with the second transmitted public key associated with the host system.

3. The host system of claim 2, wherein:
the first public key associated with the host system and the second public key associated with the host system are a same key; and
the first protection region is different than the second protection region.

4. The host system of claim 2, wherein:
the first public key associated with the host system is different than the second public key associated with the host system; and
the first protection region and the second protection region are a same protection region.

5. The host system of claim 2, wherein:
the first public key associated with the host system is different than the second public key associated with the host system; and
the first protection region is different than the second protection region.

6. The host system of claim 1, wherein the processing circuitry is further configured to cause the host system to:
transmit an updated key associated with the host system, wherein the first protection region at the memory system is associated with the updated key based at least in part on transmitting the updated key; and
transmit a second signed command to program second data to the first protection region at the memory system, wherein the second signed command is signed based at least in part on a private key associated with the host system and corresponding to the updated key.

7. The host system of claim 1, wherein the processing circuitry is further configured to cause the host system to:
transmit, to the memory system, an indication of a size of the first protection region, an address range corresponding to the first protection region, or any combination thereof.

8. A host system, comprising:
processing circuitry configured to cause the host system to:
transmit, to a memory system, one or more public keys associated with the host system, wherein each key of the one or more public keys associated with the host system is for association with a respective region of one or more protection regions at the memory system, each protection region of the one or more protection regions comprising a respective set of memory cells protected by at least two keys;
receive one or more public keys associated with the memory system, wherein each public key of the one or more public keys associated with the memory system corresponds to a respective private key associated with the memory system and is different than each of the one or more public keys associated with the host system;
generate a symmetric key in accordance with a private key associated with the host system and a first received public key of the one or more public keys associated with the memory system, wherein the private key associated with the host system corresponds to a first public key of the one or more public keys associated with the host system;
transmit a signed command to program data to a first set of memory cells within a first protection region of the one or more protection regions at the memory system, wherein:
the signed command is signed based at least in part on the generated symmetric key; and
the at least two keys for protection of the first set of memory cells within the first protection region comprise the generated symmetric key and a private key associated with the memory system and the first set of memory cells; and
transmit the data in association with the signed command to program the data to the first protection region.

9. A host system, comprising:
processing circuitry configured to cause the host system to:
transmit, to a memory system, one or more public keys associated with the host system, wherein each key of the one or more public keys associated with the host system is for association with a respective region of one or more protection regions at the memory system, each protection region of the one or more protection regions comprising a respective set of memory cells protected by at least two keys;
receive one or more public keys associated with the memory system, wherein each public key of the one or more public keys associated with the memory system corresponds to a respective private key associated with the memory system and is different than each of the one or more public keys associated with the host system;
generate a symmetric key in accordance with a private key associated with the host system and a first received public key of the one or more public keys associated with the memory system, wherein the private key associated with the host system corresponds to a first public key of the one or more public keys associated with the host system; and
transmit a signed command to program data to a first set of memory cells within a first protection region of the one or more protection regions at the memory system, wherein:
the signed command is signed based at least in part on the generated symmetric key;
the at least two keys for protection of the first set of memory cells within the first protection region comprise the generated symmetric key and a private key associated with the memory system and the first set of memory cells; and
the signed command to program the data to the first protection region comprises instructions to move the data to the first protection region from a storage location at the memory system outside the first protection region.

10. A memory system, comprising:
one or more memory devices; and
processing circuitry coupled with the one or more memory devices and configured to cause the memory system to:
receive, from a host system, one or more public keys associated with the host system, wherein each public key of the one or more public keys associated with the host system corresponds to a respective counterpart key associated with the host system and is for access to a respective protection region of one or more protection regions at the memory system, each protection region of the one or more protection regions comprising a respective set of memory cells protected by at least two keys;

transmit one or more public keys associated with the memory system, wherein each public key of the one or more public keys associated with the memory system corresponds to a respective private key associated with the memory system and is different than each public key of the one or more public keys associated with the host system;

generate a symmetric key in accordance with a private key associated with the memory system and a first received public key of the one or more public keys associated with the host system, wherein the private key associated with the memory system corresponds to a first public key of the one or more public keys associated with the memory system;

receive a signed command to program data to a first set of memory cells within a first protection region of the one or more protection regions at the memory system; and determine whether to program the data to the first protection region based at least in part on attempting to decrypt a signature of the signed command, wherein:

attempting to decrypt the signature of the signed command is based at least in part on the generated symmetric key; and the at least two keys for protection of the first set of memory cells within the first protection region comprise the generated symmetric key and a private key associated with the host system and the first set of memory cells.

11. The memory system of claim 10, wherein the processing circuitry is further configured to cause the memory system to:

receive a second signed command to program second data to a second protection region of the one or more protection regions at the memory system; and determine whether to program the second data to the second protection region based at least in part on attempting to decrypt a signature of the second signed command, wherein:

attempting to decrypt the signature of the second signed command is based at least in part on a second public key of the one or more public keys associated with the host system.

12. The memory system of claim 11, wherein:
the first public key associated with the host system and the second public key associated with the host system are a same key; and
the first protection region is different than the second protection region.

13. The memory system of claim 11, wherein:
the first public key associated with the host system is different than the second public key associated with the host system; and
the first protection region and the second protection region are a same protection region.

14. The memory system of claim 11, wherein:
the first public key associated with the host system is different than the second public key associated with the host system; and
the first protection region is different than the second protection region.

15. The memory system of claim 10, wherein the processing circuitry is further configured to cause the memory system to:
receive an updated key associated with the host system;
associating the first protection region at the memory system with the updated key based at least in part on receiving the updated key;
receive a second signed command to program second data to the first protection region at the memory system; and
determine whether to program the second data to the first protection region based at least in part on attempting to decrypt a signature of the second signed command, wherein attempting to decrypt the signature of the second signed command is based at least in part on the updated key.

16. The memory system of claim 10, wherein the processing circuitry is further configured to cause the memory system to:
receive the data in association with the signed command to program the data to the first protection region.

17. The memory system of claim 10, wherein the signed command to program the data to the first protection region comprises instructions to move the data to the first protection region from a storage location at the memory system outside the first protection region.

18. The memory system of claim 10, wherein the processing circuitry is further configured to cause the memory system to:
receive, from the host system, an indication of a size of the first protection region, an address range corresponding to the first protection region, or any combination thereof.

19. A non-transitory computer-readable medium storing code comprising instructions which, when executed by a processor of an electronic device, cause the electronic device to:

transmit, by a host system for a memory system, one or more public keys associated with the host system, wherein each key of the one or more public keys associated with the host system is for access to a respective protection region of one or more protection regions at the memory system, each protection region of the one or more protection regions comprising a respective set of memory cells protected by at least two keys;

receive, at the host system, one or more public keys associated with the memory system, wherein each public key of the one or more public keys associated with the memory system corresponds to a respective private key associated with the memory system and is different than each of the one or more public keys associated with the host system;

generate, by the host system, a symmetric key in accordance with a private key associated with the host system and a first received public key of the one or more public keys associated with the memory system, wherein the private key associated with the host system corresponds to a first public key of the one or more public keys associated with the host system; and transmit, by the host system, a signed command to program data to a first set of memory cells within a first protection region of the one or more protection regions at the memory system, wherein:
the signed command is signed based at least in part on the generated symmetric key; and the at least two keys for protection of the first set of memory cells within the first protection region comprise the generated symmetric key and a private key associated with the memory system and the first set of memory cells.

20. A non-transitory computer-readable medium storing code comprising instructions which, when executed by a processor of an electronic device, cause the electronic device to:

receive, at a memory system from a host system, one or more public keys associated with the host system, wherein each key of the one or more public keys associated with the host system corresponds to a respective counterpart key associated with the host system and is for access to a respective protection region of one or more protection regions at the memory system, each protection region of the one or more protection regions comprising a respective set of memory cells protected by at least two keys;

transmit one or more public keys associated with the memory system, wherein each public key of the one or more public keys associated with the memory system corresponds to a respective private key associated with the memory system and is different than each of the one or more public keys associated with the host system;

generate a symmetric key in accordance with a private key associated with the memory system and a first received public key of the one or more public keys associated with the host system, wherein the private key associated with the memory system corresponds to a first public key of the one or more public keys associated with the memory system;

receive, at the memory system, a signed command to program data to a first set of memory cells within a first protection region of the one or more protection regions at the memory system; and determine whether to program the data to the first protection region based at least in part on attempting to decrypt a signature of the signed command, wherein:

attempting to decrypt the signature of the signed command is based at least in part on the generated symmetric key; and the at least two keys for protection of the first set of memory cells within the first protection region comprise the generated symmetric key and a private key associated with the host system and the first set of memory cells.

\* \* \* \* \*